US 6,650,496 B2

(12) United States Patent
Nozieres et al.

(10) Patent No.: US 6,650,496 B2
(45) Date of Patent: Nov. 18, 2003

(54) FULLY INTEGRATED MATRIX MAGNETIC RECORDING HEAD WITH INDEPENDENT CONTROL

(75) Inventors: Jean-Pierre Nozieres, Corenc (FR); O. Girard, St-Egreve (FR); E. Saporito, Chatte (FR); L. Chiesi, Voreppe (FR); Joern Raastad, Oslo (NO)

(73) Assignees: PHS MEMS, Paris (FR); Tandberg Data ASA, Oslo (NO)

( * ) Notice: Subject to any disclaimer, the term of this patent is extended or adjusted under 35 U.S.C. 154(b) by 235 days.

(21) Appl. No.: 09/858,225

(22) Filed: May 15, 2001

(65) Prior Publication Data

US 2003/0011922 A1 Jan. 16, 2003

(51) Int. Cl.$^7$ ................................................ G11B 15/12
(52) U.S. Cl. ..................... 360/63; 360/121; 360/122; 360/76; 360/77.12
(58) Field of Search ...................... 360/61, 63, 121, 360/231, 230, 119, 122, 123, 76, 75, 77, 12, 22

(56) References Cited

U.S. PATENT DOCUMENTS

| 4,942,490 A | 7/1990 | Lehureau |
| 5,063,467 A | 11/1991 | Colineau et al. |
| 5,086,362 A | 2/1992 | Maurice |
| 5,124,869 A | 6/1992 | Lehureau |
| 5,394,286 A | 2/1995 | Burklin et al. |
| 5,546,255 A | 8/1996 | Colineau |
| 5,671,106 A | 9/1997 | Lehureau |
| 5,863,450 A | 1/1999 | Dutertre et al. |
| 5,933,940 A | 8/1999 | Maillot et al. |
| 5,973,890 A | 10/1999 | Lehureau |
| 5,982,591 A | * 11/1999 | Folkerts et al. ............. 360/121 |

FOREIGN PATENT DOCUMENTS

| EP | 0 463 908 A1 | 1/1992 |
| EP | 0 698 878 A1 | 2/1996 |
| FR | 2 630 853 | 11/1989 |
| FR | 2 648 940 | 12/1990 |
| FR | 2 774 499 | 8/1999 |
| FR | 2 805 709 | 8/2001 |
| WO | WO 94/15332 | 7/1994 |
| WO | WO 99/67777 | 12/1999 |

* cited by examiner

Primary Examiner—Alan T. Faber
(74) Attorney, Agent, or Firm—Schiff Hardin & Waite

(57) ABSTRACT

A matrix array of recording heads, wherein each head is independent from another both in terms of its magnetic circuit and excitation conductors. Each individual head has a planar magnetic circuit and an helical coil wrapped around the lower part of the magnetic circuit. The matrix array is collectively fabricated using full thin film technology on non-magnetic substrates. Preferably, the heads are aligned in an oblique lattice with the write gaps aligned along rows and offset by a constant value along columns. Each individual head is connected to the control electronics through interconnects to the backside of the wafer, allowing independent control of the write parameters. The die forming the device is shaped on its edges and top surface to optimize head/medium positioning and minimize wear.

38 Claims, 8 Drawing Sheets

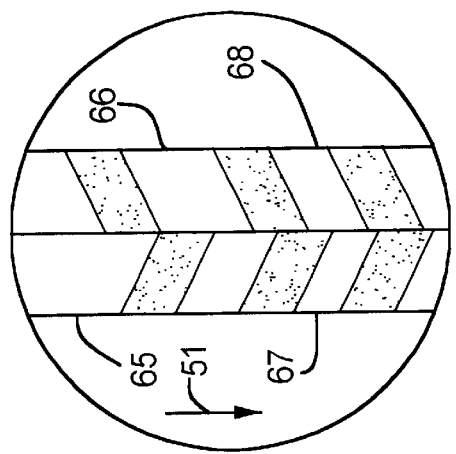
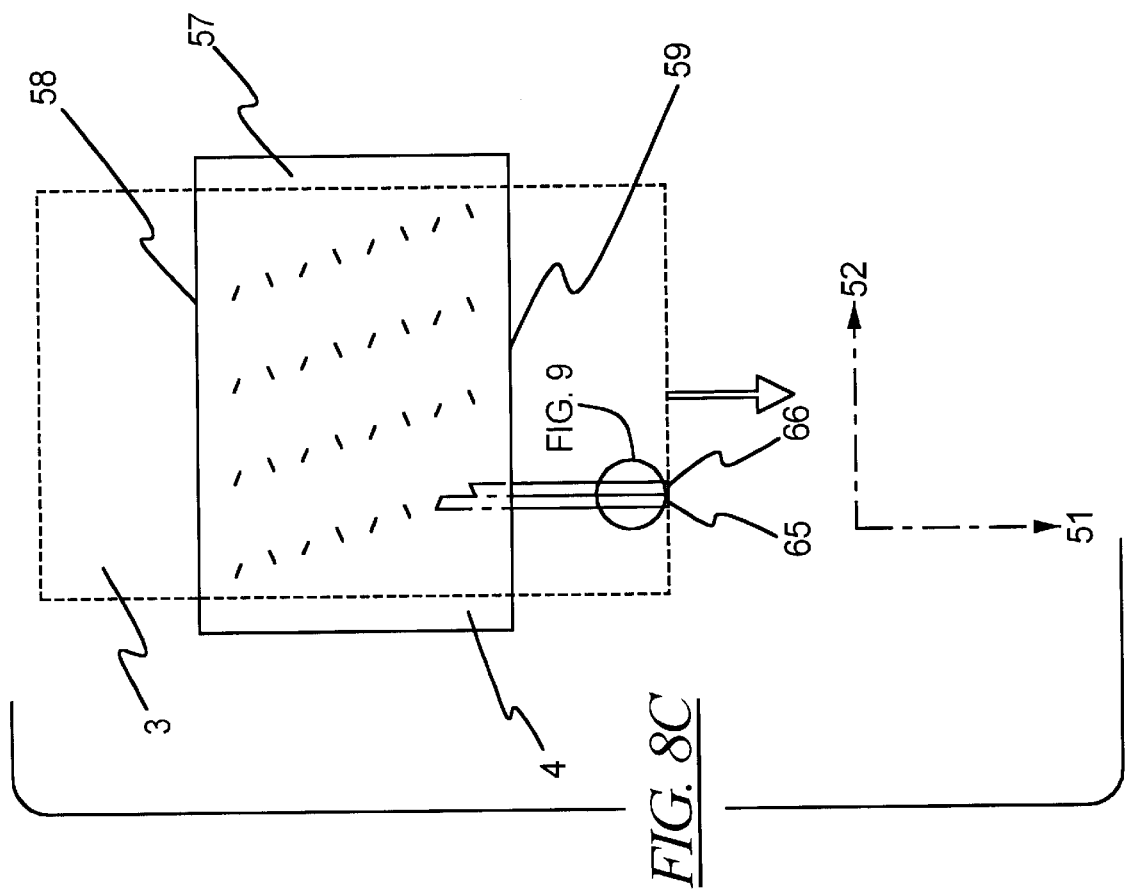

FULLY INTEGRATED MATRIX MAGNETIC RECORDING HEAD WITH INDEPENDENT CONTROL

BACKGROUND OF THE INVENTION

1. Field of the Invention

The present invention relates generally to a magnetic recording head and, more particularly, to a matrix-type thin film magnetic recording head for recording of multiple-tracks on recording tapes, for example.

2. Description of the Related Art

To keep pace with the ever increasing performance requirements of magnetic storage devices (for example, hard-disks, tapes drives or floppies), ever increasing area densities and data rates are required. The area density is limited by lateral tape motions, residual head servo tracking errors, mechanical tolerances on the head, thermal and hygroscopic coefficient of expansion of the media, etc. The most widely used approach to achieve both high area densities and high data rates is to write and read simultaneously several tracks in parallel on the tape. In standard tape drives using multiple heads, the minimum distance which is possible between neighboring heads (due mostly to the pitch of the excitation coil) still leads to a large distance between the outermost tracks which are written simultaneously when a high degree of parallelism is required (using several tape heads). The tape is filled by sequential interleaved writing, where neighboring tracks are written at different times. This interleave writing can be avoided by writing adjacent tracks at the same time using matrix arrays of heads in which packs of adjacent tracks with no or little guard band between tracks can be written simultaneously.

Such matrix heads can be made mechanically by several steps of sawing, winding and bonding, such as is known from the prior art, for example as in the fabrication of Metal-In-Gap (MIG) heads. It can also be made by hybrid technologies combining the above mentioned techniques and thin film technologies as described in the French patents Nos. 2 630 853 and 2 648 940. Narrow and densely packed data tracks can however be advantageously obtained by using full thin film technology. In thin films technologies, however, the manufacturing cost of the head is directly proportional to its surface area on the wafer. To decrease the footprint of the head on the wafer, it is necessary to minimize the area lost for the electrical connections and the pitch between adjacent heads, hence reducing the size of an elemental head. The minimization of the lost area can be achieved via interconnects, as described in the U.S. Pat. No. 5,933,940, which pushes the connection pads to the back side of the wafer, e.g. the side opposite to the recording media. The minimization of the pitch has been described in the U.S. Pat. No. 5,124,869. In the apparatus described therein, the magnetic field of the write head is not produced by a coil wound around part of the magnetic circuit, but by two single row and column conductors crossing under the magnetic poles of the corresponding write head. These column and row conductors are aligned with a head matrix network so as to obtain one head at each row/column intersection. The fabrication technique is generally of the hybrid type, using a magnetic (preferably ferrite) grooved substrate onto which the conductors are arranged and magnetic poles and gaps to close the magnetic circuit obtained either by thin layer deposition or from a second substrate which is subsequently bonded to the first substrate.

Although this head provides for a great integration, in particular due to the absence of coil windings, it has several drawbacks.

First: the addressing of a single head element is done by the superposition of the row and column excitation field, the field created at the gap of the head onto the medium being practically proportional to the sum of the excitation current of the row and column. The head has therefore to be designed such that an individual excitation by a given row (or column) is insufficient to overcome the medium coercive field, whereas the sum of the row and column excitation contributions is large enough to overcome the coercive field. In the original embodiment, this is done by using a dipolar pulse of amplitude 2I/3 on the columns (or row) and a pulse of amplitude +I/3 or −I/3 on a row (or column). These recording embodiments however can lead to a significant parasitic recording signal being sent by a neighboring cell on the corresponding column, in the form of an undefined magnetic state on the medium. This is known as crosstalk, in other words, recording by a head which has not been selected to write. To overcome this issue, complex recording schemes have been developed such as described in the U.S. Pat. No. 5,394,286. Other approaches include using saturable soft magnetic layers within the gap which would saturate (and hence allow the magnetic flux to leak onto the medium only if the excitation field is large enough), a writing scheme by inhibiting a 4 pole magnetic head, secondary gaps to increase the head overall reluctance, a derived current of opposite polarity to the excitation current in neighboring cells through a well chosen resistor, addressing ICs, etc. These refinements are described in particular in the U.S. Pat. Nos. 5,973,890; 5,063,467; 5,546,255; 5,086,362, the published International PCT Patent Application No. W094/15332, and the European Patent Document EP0 463 908. All add some undesirable complexity to the system.

Second, as linear excitation conductors that correspond basically to a single turn coil (two turns if one considers the sum of a row and column conductor for the selected head), the excitation current required to achieve the gap field which can reverse the media magnetization is rather high. An alternative in which the excitation is provided by an independent magnetic circuit using a multiple turns coil coupled to single conductor that is in to turn coupled to the write head has been described in the U.S. Pat. No. 5,671,106. The major drawbacks of this design, however, are a large total footprint of the head on the wafer (and hence a high cost), and in a matrix design an increased inductive/capacitive crosstalk through the connection conductors.

Third: manufacturing which involves both macroscopic and thin film technologies does not allow for an increased integration for future generation products which will require ever decreasing individual data track widths. The integration into a full thin film technology has been described in the U.S. Pat. No. 5,933,940 based on the row/column excitation conductor design.

SUMMARY OF THE INVENTION

The present invention enables all of the above mentioned limitations to be overcome, using a matrix array of adjacent and independently controlled write heads using only thin film technologies. Furthermore, the present invention apparatus allows for the head surface contour (tape bearing surface) to be integrated during the manufacturing process.

The device of the present invention includes a matrix array of recording heads, wherein each head is independent from another both in terms of its magnetic circuit and its excitation circuit. In one embodiment, the matrix array is fabricated using thin film technology and a planar design, as described for example in the patent U.S. Pat. No. 5,863,450, filed by one of the applicants and incorporated herein by reference. In another embodiment, the heads are aligned in an oblique lattice with the write gaps aligned along a (horizontal) row and offset along a (vertical) column by a constant value.

Each magnetic head includes a magnetic circuit formed by a bottom pole piece, two pillars and a top pole piece cut by a non-magnetic (generally insulating) gap. A conducting coil is wrapped around either the pillars or the bottom pole piece to provide, when excited by an electrical current, a magnetic flux within the magnetic circuit which magnetizes the recording medium in the vicinity of the gap where the flux leaks out in space. Preferably, the magnetic heads are of a helical type, for example, wrapped around the bottom pole piece to ensure a better coupling with the magnetic circuit, hence a lower excitation current or a lower number of turns, and a smaller footprint. To fabricate these helical heads, it is best to use the thin film technology in which the different elements are shaped by successive steps of thin film deposition, photolithography, etching, with intermediate steps of encapsulation and planarization. The heads are fabricated onto a non-magnetic substrate, preferably silicon, which acts as the head body.

The gap of the upper poles, which is a critical part of the magnetic circuit, is fabricated using conformal deposition. This techniques uses the following sequence: fabrication of one of the poles, conformal deposition of the gap, fabrication of the second pole, and planarization to bare the gap. With a method of this type, as already proposed in the patents U.S. Pat. No. 4,942,490 and International application No. W099/67777, it is possible to obtain very thin gaps (hence large writing fields) at the expense of an oblique gap and a residual gap under the first pole piece, hence an unnecessary high reluctance of the magnetic circuit. The process used in the present invention differs markedly for the above in that it allows a vertical gap with no residual gap material under any of the pole pieces.

Each of the individual excitation coils is connected to the back side of the substrate by interconnects through the non-magnetic wafer. Preferably, the interconnects are shifted to the sides of the matrix array itself to allow the smallest pitch between each individual head. The interconnects can be made by drilling into the silicon and filling with a conducting material, by using highly doped conductive silicon with etched trenches, or any other method thereof. On the side opposite to the heads the interconnects can advantageously be terminated by low melting temperature bumps such as TiSn or SnPb or any other material, in order to allow for the connection of the die to the control electronics, for instance through a flex cable. In a preferred embodiment, two or more heads have one common lead so as to decrease the number of interconnects.

The individual heads are arranged in rows and columns in order to simultaneously write parallel tracks of data onto the media. The general layout is defined by external parameters such as the overall size of the matrix array, the number of tracks to be written, the data track width and the track density, etc. In a preferred embodiment, the write gaps within a given column (row) are offset laterally one from another but they remain aligned horizontally along a row (column). All the rows (or columns) are then parallel one to each other but the overall matrix array is not necessarily square. This allows the writing of adjacent tracks without the need for tilting the tape with respect to the head or vice versa. In another preferred embodiment, the number of columns (or rows) is limited to two so that all the connecting leads can be pushed to the outside of the matrix array, hence avoiding the need to provide a guardband (i.e. a width of the tape with no data written onto it) between blocks of tracks from adjacent columns (or rows). In another preferred embodiment, the gaps, instead of being all similar, have different widths and/or lengths to correct the eventual fluctuations in the head to tape positioning.

The matrix may can be covered with a wear resistant material such as diamond-like carbon or any material that would exhibit good tribological properties against the recording medium. The top surface, which corresponds to the side with heads, and the die as a whole, can be advantageously shaped to minimize wear and/or to facilitate the positioning of the tape with respect to the head, both laterally and vertically. This may include, but is not limited to, rounded edges, special features to evacuate loose particles, protruding heads, etc. The area of the die outside the active region where the matrix array is located can also be covered with a material whose properties are well suited against wear, electrostatic charging, or other damaging effects.

Finally, each head of the matrix array is individually driven via at least one independent lead of each head by the control electronics either through individual sources of current, or through a multiplexing system which allows a limited number of heads to be driven at one given time. Each head current can be adjusted independently to the required value to obtain good writing properties, thus enabling the fluctuations due to manufacturing tolerances, lifetime wear and/or tape flutter to be leveled out. Moreover, a special writing sequence of the heads within a row or a column can be chosen so that the crosstalk is minimized.

BRIEF DESCRIPTION OF THE DRAWINGS

The main features and advantages of the invention will appear from the following description of its embodiments, the description being made with reference to the appended drawings.

FIGS. 8A, 8B and 8C is a schematic illustration of the write gaps of the array when the matrix array is square and when it is oblique with parallel and staggered gaps, respectively; and FIG. 9 is an enlarged view of the circled portion of FIG. 8C.

DETAILED DESCRIPTION OF THE PREFERRED EMBODIMENTS

Figure 1:
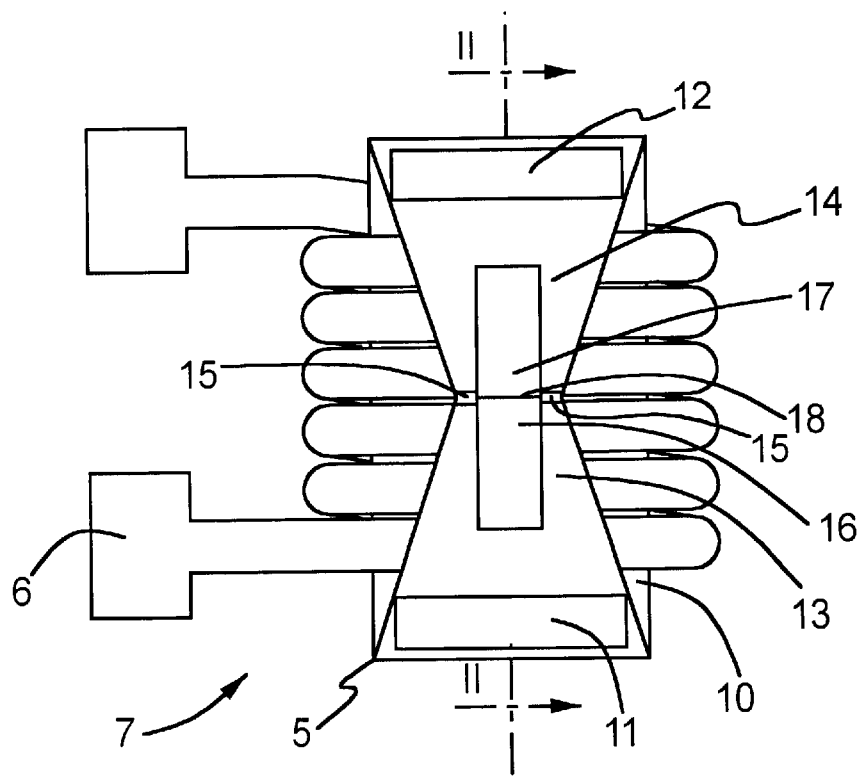
FIG. 1 is a top plan view of the elemental head of the matrix array according to the invention.
Figure 2:
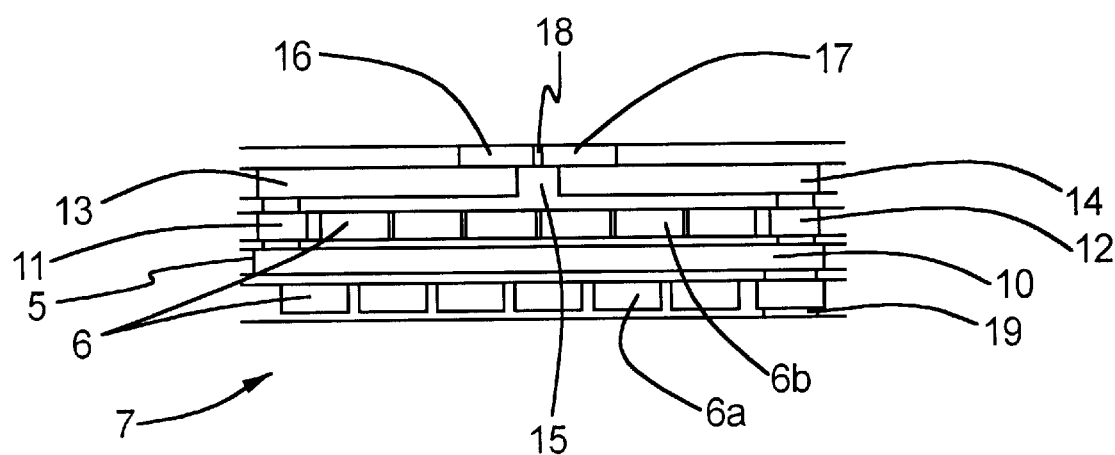
FIG. 2 is a side cross section along line II—II of FIG. 1.

An individual magnetic head corresponding to one cell of the matrix array is depicted in FIG. 1. It is formed of a magnetic circuit 5 and an excitation conductor 6, all being fabricated onto a non-magnetic substrate or wafer 7. The magnetic circuit 5 is formed of a bottom pole piece 10, two pillars 11 and 12 and two concentrators 13 and 14, all made of magnetic material such as NiFe or any other soft magnetic material with a large enough magnetization and permeability. The concentrators 13 and 14 are interrupted so as to define a wide gap 15. On top of the wide gap 15 and connecting directly to the concentrators 13 and 14 are the two pole pieces 16 and 17 formed of a high saturation magnetization material, in order to prevent the detrimental saturation of the poles during writing which could lead to poorly defined data tracks. The pole pieces 16 and 17 are of a material that can be, but are not limited to, sputtered FeTaN/TaN multilayers or plated FeCoNi, FeCoCr or NiFe, all with the appropriate composition. The two poles 16 and 17 are interrupted as to define a small gap 18 which corresponds to the writing gap onto the medium. In one embodiment, one of the sides of the bottom pole pieces can be connected to a ground pad 19, as shown in FIG. 2. In an alternative embodiment, the concentrators 13 and 14 and the poles 16 and 17 can be merged (part 13 with 16 and 14 with 17) so as to have only one level of fabrication. In this case, there is only one gap defined, which corresponds to the writing gap 18.

Figure 3A:
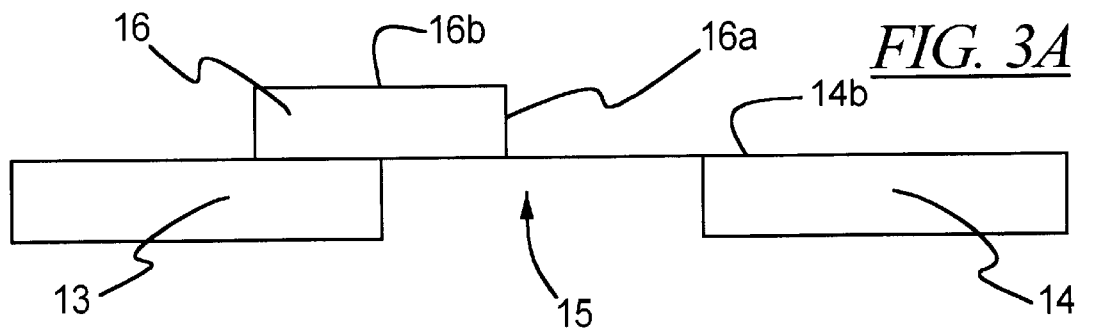
FIGS. 3A, 3B, 3C and 3D are side views which show the fabrication procedure of the writing poles, including the gap material, which prevents the existence of a secondary gap in the magnetic circuit.
Figure 3B:
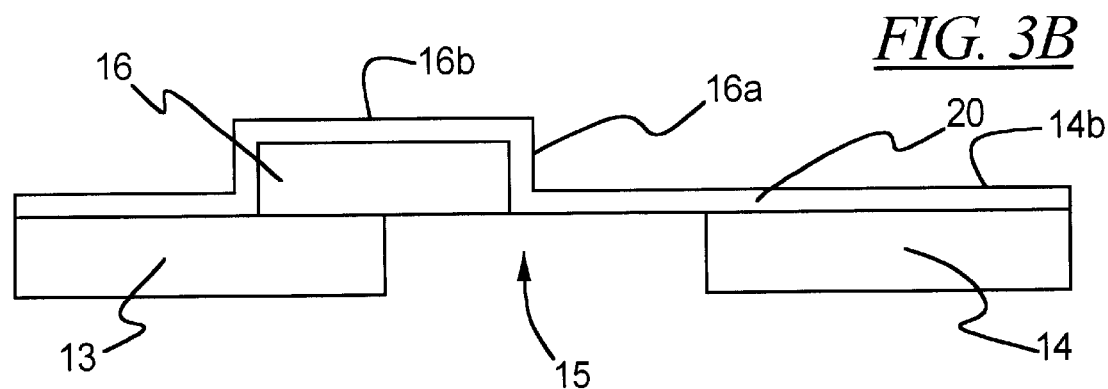

The gap 18 is defined using conformal deposition technique as can be seen from FIGS. 3A to 3D. The pole 16 is first deposited onto the planar surface formed of the concentrators 13 and 14 and the large gap 15, and is patterned so as to define a sharp step 16a, as shown in FIG. 3A. A sheet film of non-magnetic material 20, preferably an insulating material such as $SiO_2$, $Al_2O_3$ or any other material with similar magnetic and electrical properties is then deposited so as to cover the step 16a, as shown in FIG. 3B. This can be done either by grazing incidence deposition, such as described in the French Patent No. 2,774,499 filed by one of the applicants or by sheet film deposition using a highly isotropic deposition technique such as CVD (Chemical Vapor Deposition) or PECVD (Plasma-Enhanced Chemical Vapor Deposition). The non-magnetic material 20 also is deposited on surfaces 16 and 14 forming surfaces 16b and 14b, respectively.

Figure 3C:
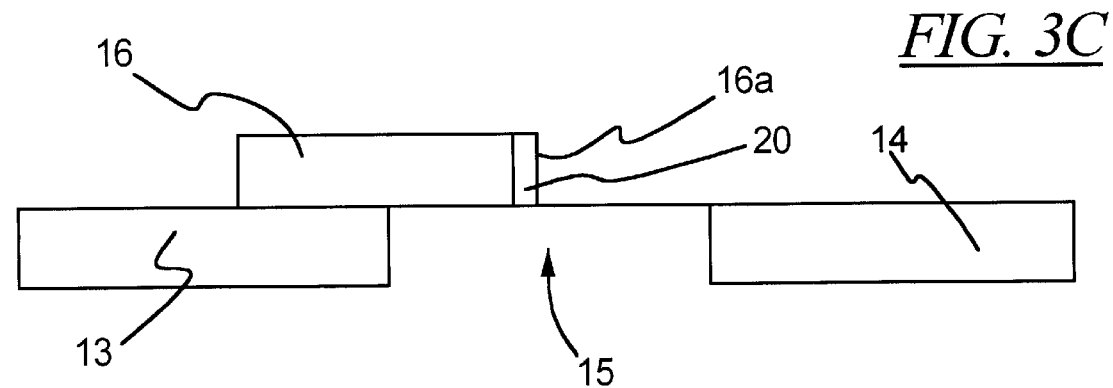
Figure 3D:
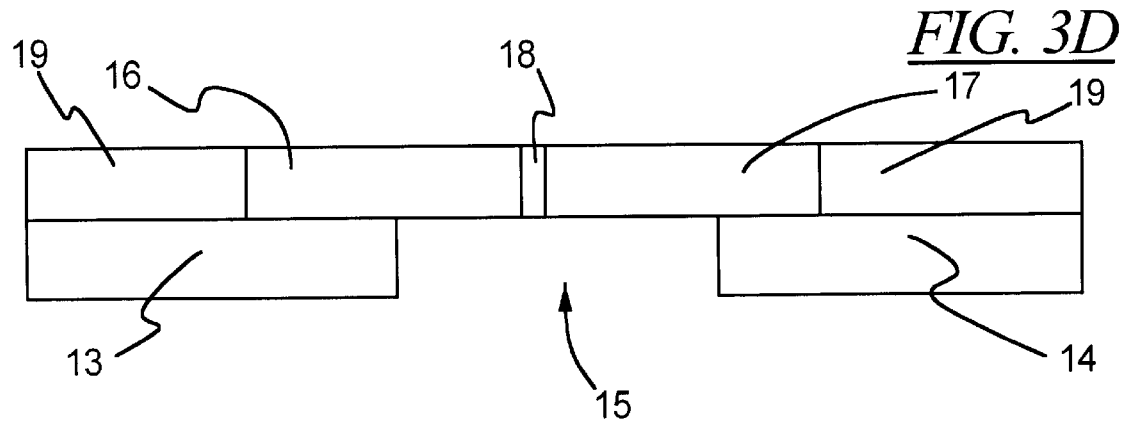

As shown in FIG. 3C, the non-magnetic material 20, which is also referred to as a gap material 20, is then removed from the surfaces 16b and 14b by any appropriate etching process in a way that no or little of the gap material 20 that was deposited onto the surface of the step 16a is removed. This is preferably performed using the process described in the U.S. Pat. No. 4,942,490. This is particularly important for the surface 14b of the concentrator 14, as any residual gap material remaining on the surface 14 introduces a secondary gap in the magnetic circuit which will deteriorate the performance of the head. The remainder of the gap material on the surface 16a forms the gap 18 of the head. As shown in FIG. 3D, the second pole material 17 as well as an encapsulation layer 19 is then deposited and a final planarization is performed to open the gap 18 and achieve the appropriate thickness for the poles 16 and 17.

The excitation conductor 6 is advantageously wrapped around the bottom pole piece 10 to obtain a better coupling with the magnetic circuit 5. It could also in another design be wrapped around one or both of the pillars, as described in the U.S. Pat. No. 5,853,450 filed by one of the applicants, although this configuration would limit the density integration by imposing a greater minimal pitch between adjacent heads. To wrap the conductor 6 around the bottom pole piece 10, several levels of micro-fabrication are required in order to achieve two levels of the coil 6a and 6b as well as several interconnects between each level of the coil 6a and 6b. The number of turns of the coil 6 wrapped around the bottom pole piece 10 depends on the performance required. A balance has to be found between a large number of turns allowing low excitation currents and a small number of turns to achieve low resistance and a small footprint. Preferably, the number of turns is 3 or greater.

Figure 4:
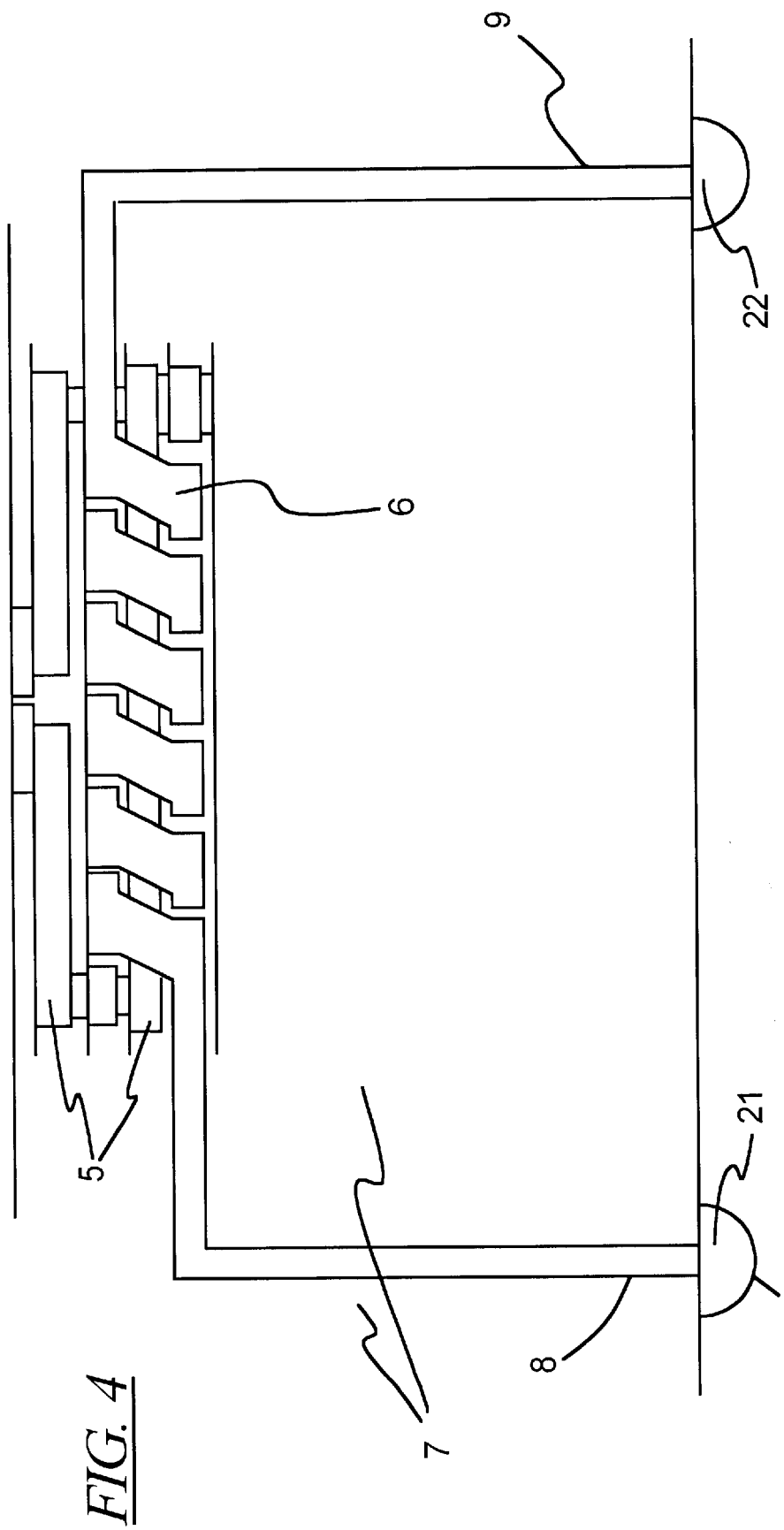
FIG. 4 is a side view which shows the layout of the head onto the substrate which will form the body of the head (the die), including the interconnects to the back side and the leads to the control electronics.

As shown in FIG. 4, the excitation conductor 6 that is wrapped around the magnetic circuit 5 is connected to the control electronics through interconnects 8 and 9 going through the substrate 7. These interconnects 8 and 9 can be formed either by drilling holes in the substrate 7 and filling them with a conducting material, as is known from the prior art; or by using a conductive substrate 7 and drilling holes and trenches to be filed by an insulating material and/or a void (such as air) as described in the French Patent No. FR 00.02446, filed by one of the Applicants. The interconnects 8 and 9 can be below the heads, but preferably, and for ease of fabrication, they are offset to the sides of the head. On the side opposite to the head, the interconnects can advantageously be terminated by bumps 21 and 22 made of low melting temperature materials such as TiSn or PbSn or any other material with similar properties. The bumps 21 and 22 allow for an easy connection to the control electronics by wiring using a flex cable, flip chip or similar device.

The embodiment described above leads to writing performances which are much better than what is already known from prior art for matrix heads designs, in particular those with a single row/column excitation conductor. In particular, Large writing fields can be achieved with moderate excitation currents I, due to the excellent coupling between the excitation coil 6 and the magnetic circuit 5.

The inductance and resistance of the excitation coil 6 is very low due to its compact design. This is particularly important when dealing with high frequency properties of individual heads, but also with magnetic crosstalk between adjacent cells and overall power consumption in matrix arrays.

The critical dimensions of the head, i.e. the gap 18 thickness and write poles 16 and 17 widths, which define the linear and track densities are controlled by micro-fabrication techniques.

The heads are collectively fabricated on the wafer 7 using thin film technologies only, resulting in a reduced cost.

The head design is scalable to smaller dimensions (hence providing improved area densities) with no major alteration of its output performances, without any major modification neither in the design nor in the process.

Each head can be controlled independently through its two conductors, thus allowing the distributions due to fabrication tolerances to be leveled-out by fine tuning of the excitation current.

The heads can be flip-chipped onto the control electronics thanks to the interconnects and bumping technologies.

Figure 5A:
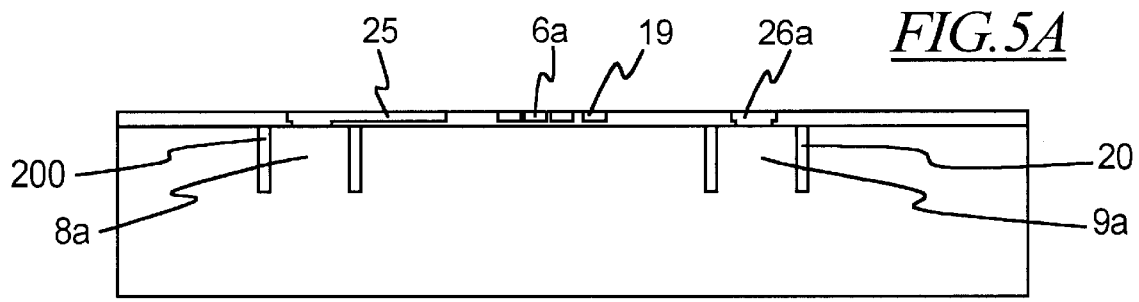
FIGS. 5A, 5B, 5C and 5D are side views which show a preferred process flow to fabricate such a head as described in FIGS. 1–3D.
Figure 5B:
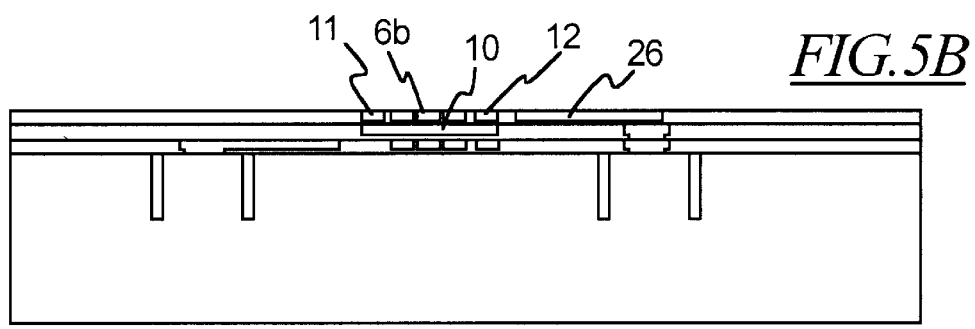
Figure 5C:
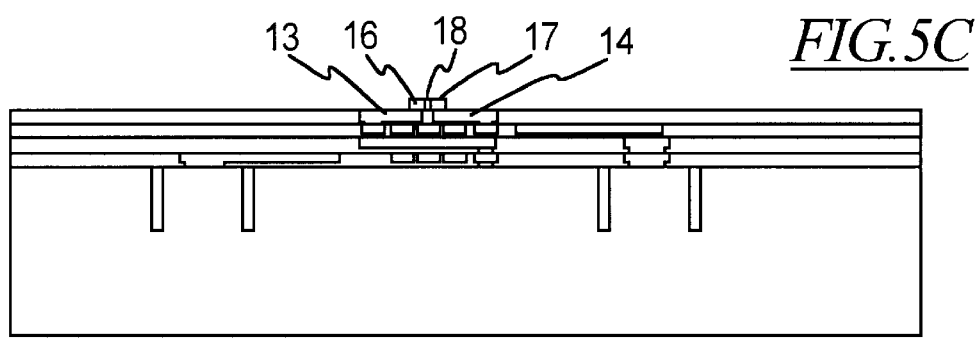
Figure 5D:
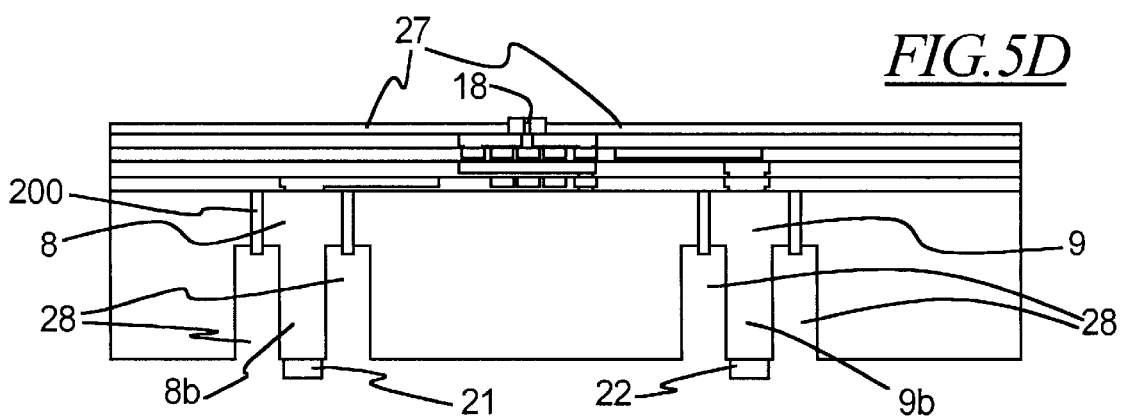

A typical fabrication process flow is shown in FIGS. 5A–5D as an illustration. As shown in FIG. 5A, the interconnects 8a and 9a on the front (heads) side of the substrate are first fabricated, with the corresponding insulating material 200. The lead 25 to the first level of coil 6a is then fabricated together with the ground part 19 and a part of the lead 26a to the second level of coil (see FIG. 5A). The bottom pole piece 10, the pillars 11 and 12, and the lead 26 to the upper level of coil 6b are then fabricated (see FIG. 5B), followed by the concentrators 13 and 14, and the top poles 16 and 17 with the gap 18 (see FIG. 5C). The tribological overcoat 27 is then deposited as a full sheet film so that after final planarization there will be no recess in the poles as seen by the recording medium (see FIG. 5D). The bumps 21 and 22 are finally made on the back side of the wafer and the interconnects 8 and 9 are finished on the back-side by etching the wafer 7 to define pillars 8b and 9b that are insulated from the substrate 7 by the insulating material 200 and air 28 (as shown in FIG. 5D).

Figure 6:
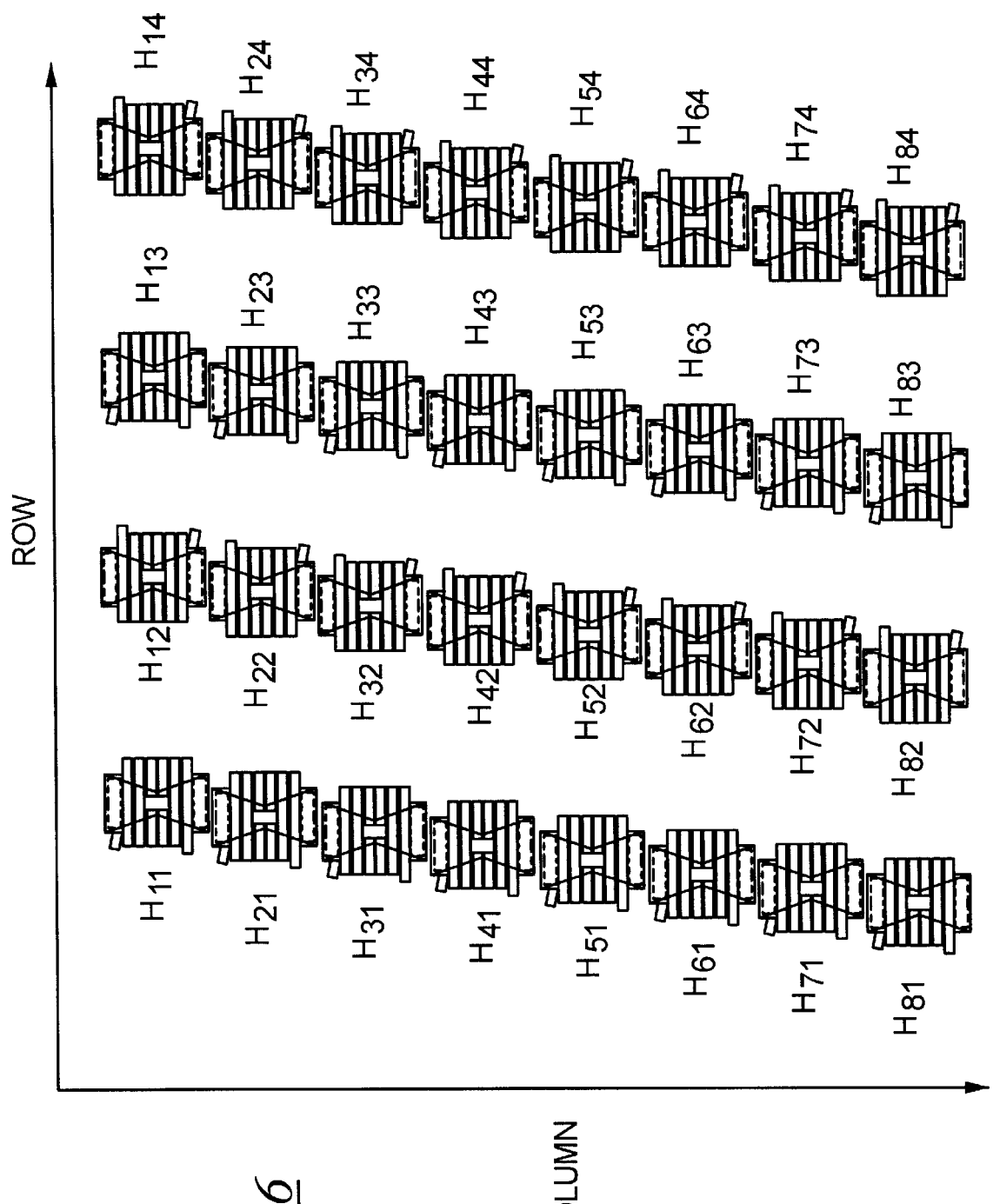
FIG. 6 is a schematic representation of a 4×8 matrix array of heads according to the present invention.
Figure 7:
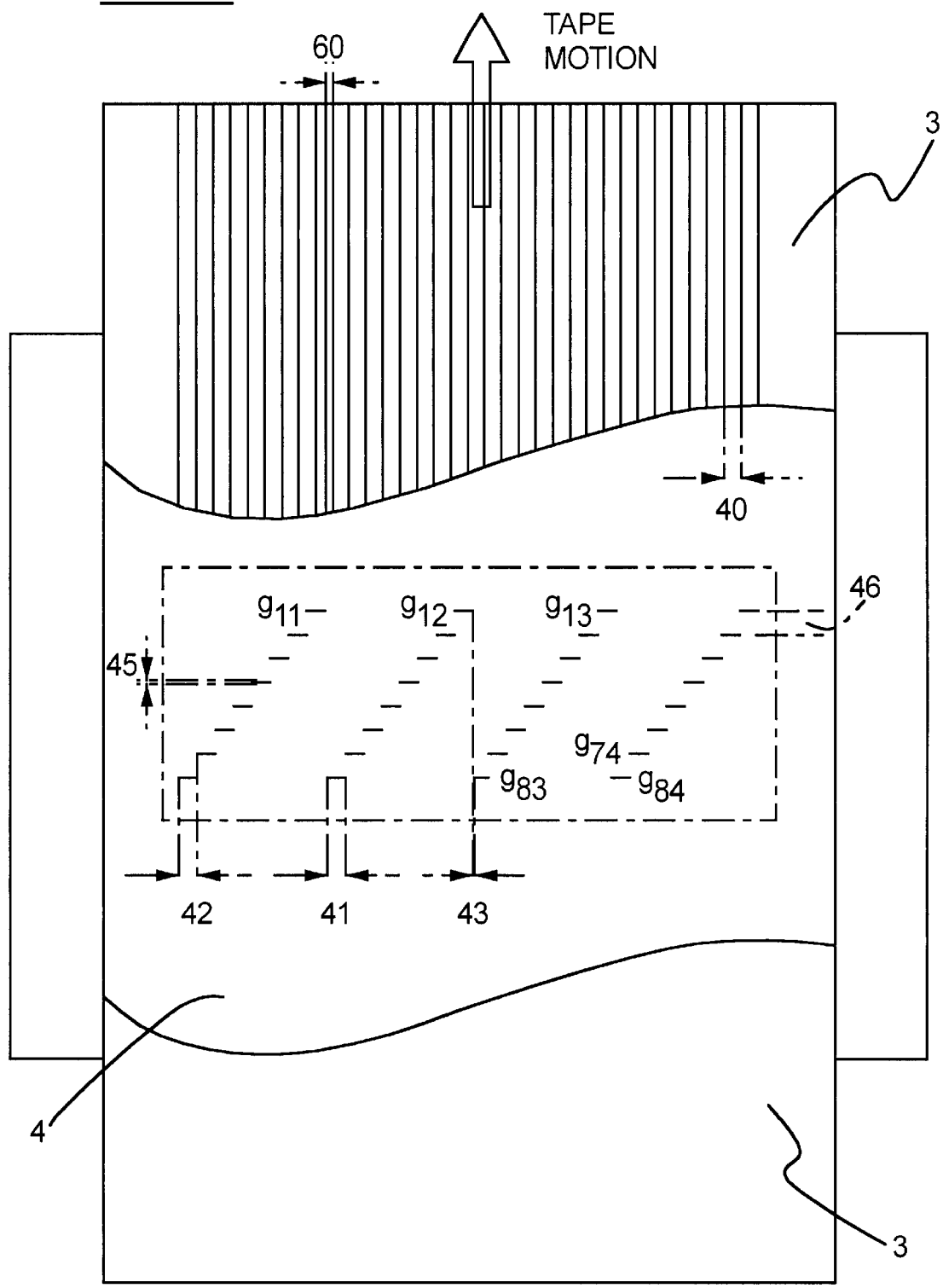
FIG. 7 is a schematic diagram showing the same matrix array layout as in FIG. 6 with only the write gaps shown and illustrating the relationship to the data tracks on the tape.

An array of independent heads such as described above can be used to write parallel data tracks on linearly moving tapes. A typical matrix array layout of 4×8 heads $H_{11}$, $H_{12}$, $H_{13}$, $H_{83}$ and $H_{84}$ is shown in FIG. 6 as an illustration. The corresponding layout of the write gaps $g_{ij}$ ($g_{ij}=g_{11}$, $g_{12}$, $g_{13}$, ... $g_{83}$, $g_{84}$), which define the location at which the data tracks are written, is shown in FIG. 7. The direction of motion of the tape is perpendicular to the gaps $g_{ij}$, as indicated in FIG. 7. The area density that can be achieved by multiple parallel tracks on recording tapes is the product of the track density across the tape (transverse to the tape motion) and of the bit density along a track (longitudinal to the tape motion). The bit density is determined by a complex convolution of the gap 18 thickness, the linear motion of the tape and the write frequency. The track density, however, depends strongly on the layout of the gaps $g_{ij}$; the important factor being the width of an individual track (also referred to as trackwidth) 40, which is more or less equal to the widths 41 of the gaps $g_{ij}$, the distance between neighboring gaps $g_{ij}$ (crosstrack pitch) 42, which, if smaller than the gaps $g_{ij}$ widths 41, leads to a non-zero overlapping of adjacent tracks and the distance between adjacent columns of heads (provided as a guardband) 43 which will be described below.

On paper, the distance 46 between gaps $g_{ij}$ and $g_{i+1j}$ within a same column (on-track pitch) does not play any role on the area density, given that the writing frequency and the tape speed are kept to a constant ratio. However, due to imperfections in the guidance of the tape, leading to tilting of the tape 3 with respect to the head die 4, a significant data track overlap can happen between the last head of a row and the first head of the adjacent row (for example on FIG. 7 $g_{12}$ and $g_{83}$). This track overlap can be particularly detrimental if it is large enough to erase totally or partially one track of data. For a given skew of the tape, this track overlap is increased when the overall on track pitch is increased. Given that most linear tape drives have no or very limited servoing capabilities to control the tape skew, it is therefore very important to keep this on-track pitch to its minimum. Therein lies the requirement for a compact individual head design such as that described in the present invention: The helical coil design allows for a much greater compactness than other designs of the prior art, keeping however the large number of turns (hence the low excitation current) and the independent control of the heads which is difficult using the conductors matrix excitation scheme as described in the previous documents cited therein.

In a preferred embodiment, the gaps $g_{ij}$ can have different widths 41 and/or lengths 45, in particular at the top and bottom of each column, in order to minimize the effect of tracks overlapping due to such things as tape skew, mechanical tolerances, environmental factors affecting the media, etc.

Figure 8A:
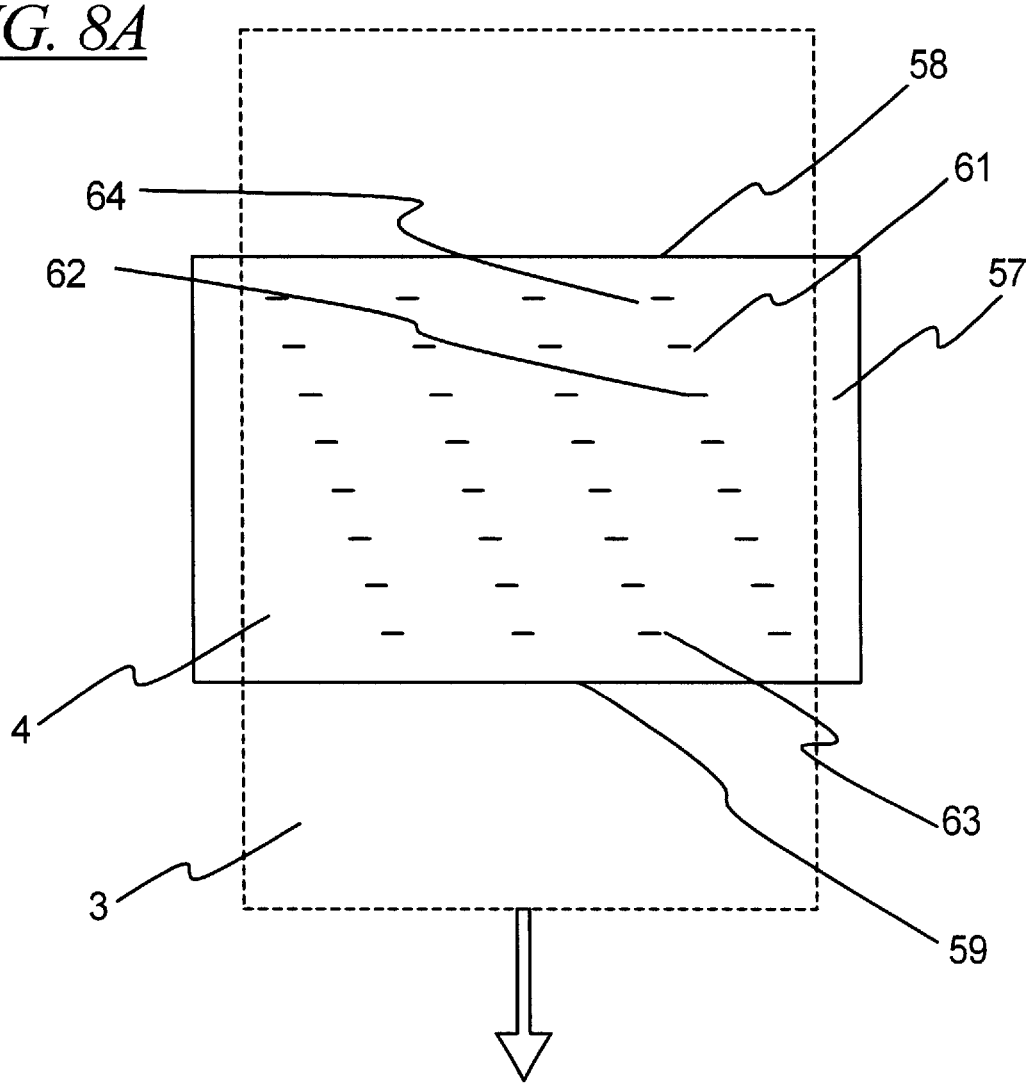

To write on the tape parallel adjacent tracks of trackwidth 40, it is possible as is known from the prior art using square matrix arrays of heads to tilt the head die 4 with respect to the tape 3 as disclosed in FIG. 8A. The tilt angle 50 is such that the projection 43 along the direction 51 of the tape motion (also referred to as the downtrack direction) of the gaps $g_{ij}$ width 41, is equal to the projection 45 along the same direction of the distance 42 between neighboring gaps $g_{ij}$ and $g_{i+1j}$ along one given column. By doing so, packs of data tracks of trackwidth 40 are written by each set of column of the matrix array. Similarly, the projection 44 along the same direction 51 of the distance between the left (right) side of the last gap 55 of a given row and the left (right) side of the first gap 56 of the next adjacent row must be greater than the trackwidth 40 to ensure that packs of data of neighboring columns do not overlap. If the distance 44 is larger than the trackwidth 40, then a band of tape with no data (a guardband 60) is present between two packs of data of neighboring columns. Although such a guardband 60 may be helpful in some points, it is certainly detrimental in terms of area density.

Figure 8B:
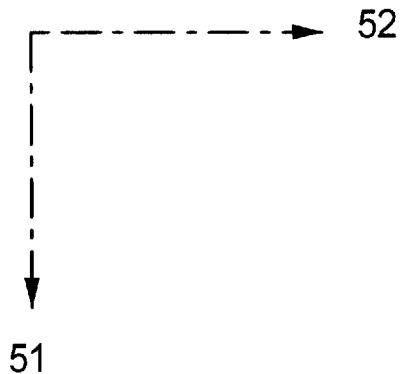

The major drawback to a non-zero tilt angle 50 is that data will be written at a nonzero azimuth angle. In a preferred embodiment of the invention, the matrix array is not square but oblique as defined on FIG. 8B. This allows the head die 4 and the tape 3 to be aligned during operation, i.e. the direction of motion of the tape 51 and the edges 58 and 59 of the head die 4 are perpendicular. In order to write parallel adjacent tracks, the neighboring gaps $g_{ij}$ and $g_{ij+1}$ along one given column must be such that projected along the tape motion direction 51 the right (left) edge 61 of $g_{ij}$ is adjacent to the left (right) edge 62 of the gap $g_{i+1j}$. Similarly, the edge 63 facing the next column of the last gap in a given column must be, when projected along the direction 51, adjacent to edge 64 facing the given column of the first gap of the next column in order to ensure proximity between the tracks. By doing so, it is now possible to write adjacent parallel tracks on the media 3. In a preferred embodiment, the sides 58 and 59 are blended to an appropriate curvature so as to introduce a negative pressure during the motion of the tape 3 between the top surface of the head die 57 and the bottom surface of the tape 3a. In another preferred embodiment, the top surface of the head die 57 can be designed with a 3-dimensional profile that favors the evacuation of loose media particles that may damage the heads of the matrix array. Finally, in another preferred embodiment the top surface of the head die 57 can be covered fully or partially at well defined locations by a wear resistant and/or electrostatic resistant material to minimize wear and/or electrostatic discharges during operations.

In another preferred embodiment, the geometry of the matrix array can be advantageously reduced to two columns (of n rows) to facilitate the layout of the interconnects while keeping proximity between adjacent blocks of tracks of neighboring columns. By doing so, it is possible to push all the leads and interconnects outside of the matrix array. This not only eases the manufacturing process, but it also facilitates the further miniaturization when track widths will be reduced in next generation products. It will then be possible to scale down the whole matrix array while keeping similar performances.

The gaps $g_{ij}$ have been so far considered horizontally aligned in the crosstrack direction 52 (perpendicular to the direction of the tape 51). It is, of course, possible to have the rows shifted vertically (along the tape direction 51). It is also possible to have the gaps $g_{ij}$ staggered within a given column as shown in FIG. 5C. This particular arrangement allows adjacent tracks 65 and 66 to have different (for example opposite directions 67 and 68 on FIG. 8C) orientation with respect to the tape motion direction 51. This bits/tracks configuration, which is called azimuthal recording, is well known in the prior art to minimize the potential crosstalk between adjacent tracks when reading the previously written data tracks. The adjacent tracks 65 and 66 are shown in detail in FIG. 9.

Finally, some specific heads of the matrix array could be used for servoing as suggested in the U.S. Pat. No. 5,122, 917. Advantageously, thanks to the design and fabrication process of the invention, this (these) servo head(s) could be positioned on the head die 4 outside of the matrix array. This (these) servo head(s) could also have different geometry than that of the heads within the matrix array, in particular as far as the trackwidth 40, the gap width 18, and the number of turns of the excitation coil 6 are concerned.

As seen from the above description, one of the major advantages of the invention is the possibility to control independently the excitation current of each head of the matrix array. This is similar to what is done in the prior art for arrays of heads formed by merging independent single element heads by gluing, bonding or some other assembly technique with the additional advantage of low cost implementation and low downtrack pitch 46. In this framework, each head can be excited sequentially or several of them can be excited simultaneously to take full advantage of the increased parallelism resulting from the large number of heads in the array. If the heads in the array have no common lead, this independent control is straightforward. If two or more heads in the array have a common lead, the independent control is still possible if the common lead is the ground lead, for example, although independent control would still be possible if the common lead is not the ground lead.

A major advantage of the present invention is that the independent control of the individual heads allows for a complete freedom in the sequence and format (number of heads excited, polarity and amplitude of the excitation, etc.) of the excitation. The major drawback in matrix arrays during the writing sequence is the crosstalk, e.g. the parasitic writing (full or partial) of the media by heads that are not selected to write. This can happen either by stray fields from and to the magnetic circuits 5 of adjacent heads, inductive and/or capacitive coupling through the coil and/or the connecting leads, or direct excitation by the coils and conductors if they are connected in series for several heads. The stray fields are particularly critical in designs known from the prior art and several alternatives have been envisioned to overcome this issue, as described at the beginning of this document. The most obvious alternatives are sending an excitation signal of an opposite polarity in the heads through a well defined resistor (but this complicates the conductors layout a lot) or through a complex recording scheme and addressing ICs. When the heads are controlled independently as is the case in the present invention, this tactic can be done simply, by the direct injection of a current in the non-selected cells. There are numerous other approaches known from the prior art or which are possible with the present invention that we do not discuss further here. The above mentioned approach should by no means be taken as a unique solution.

The addressing of the different elements of the heads is generally done by the control electronics within the electronic board of the drive. Advantageously in the present invention, the non-magnetic substrate 7 can be made of silicon which allows for the control electronics to be integrated within the substrate 7 and consequently within the head die 4, either as a whole or only partly. Advantageously, at least the multiplexing electronics is integrated within the head die 4 so as to minimize the overall resistance and inductance of the excitation leads. Another possibility is to flip-chip the head die 4 directly onto another substrate including the control electronics using the array of bumps 21 and 22. This approach takes full advantage of the interconnects and bumping technology as described in the present invention.

The device of the invention can be advantageously used coupled with a read head as described in the U.S. Pat. No. 5,920,538 filed by one of the applicants, wherein the information written on the recording medium is duplicated by a magnetic layer formed of a Faraday layer and possibly a Kerr layer deposited at the surface of the read head facing the medium.

Thus, there is shown and described a magnetic head matrix array with each head magnetically and electrically independent of one another. The heads are formed with full use of thin film technology and are formed to optimize head position.

Although other modifications and changes may be suggested by those skilled in the art, it is the intention of the inventor to embody within the patent warranted hereon all changes and modifications as reasonably and properly come within the scope of their contribution to the art.

We claim:

1. A device for recording information onto a magnetic medium, comprising:

a matrix array in a single plane facing the magnetic medium, said matrix array including magnetic recording heads arranged to form said matrix array, said magnetic recording heads each including a magnetic circuit and each defining a gap in said magnetic circuit;

excitation coils for said magnetic recording heads connected to independently control each of said magnetic recording heads;

control electronics;

connection conductors for each of said magnetic recording heads connecting said control electronics to said excitation coils; and a head die formed of a non-magnetic substrate material on which said device is fabricated fully by planar thin film technology.

2. A device as claimed in claim 1, wherein said connection conductors of each of said magnetic recording heads are independent of conductors of others of said magnetic recording heads.

3. A device according to claim 1, wherein at least one of said connection conductors of each of said magnetic recording heads is independent from others of said connection conductors of the matrix array, an other of said connection conductors being common with two or more of said connection conductors of others of said magnetic recording heads of the matrix array.

4. A device as claimed in claim 3, wherein said common connection of said conductors are ground conductors.

5. A device according to claim 1, wherein said magnetic circuits of said magnetic recording heads each having a lower part, said excitation conductors of each individual ones of said magnetic recording heads being wrapped around said lower part of the magnetic circuit of said magnetic recording heads so as to form a compact helical coil.

6. A device according to claim 5, wherein said excitation conductors are wrapped around said lower part by a number of turns that is greater than three.

7. A device according to claim 1, wherein at least some of said connection conductors connecting said excitation conductors to said control electronics are interconnects in said non-magnetic substrate material.

8. A device according to claim 7, further comprising:
at least one of bumps and pads at ends of said interconnects so as to allow direct assembly and electrical connection with the subsequent elements used to link the head to the control electronics.

9. A device as claimed in claim 1, wherein said magnetic recording heads include first and second poles, said magnetic heads including gap material in said gap, said gap material being provided by conformal deposition on said first pole and being absent from under said second pole.

10. A device according to claim 1, wherein said matrix array is rectangular, said matrix array being formed of n rows and m columns, wherein the gaps are positioned with their width along the rows and their length along the columns, said n rows and m columns being parallel one to another so as to write parallel and adjacent tracks onto the medium when the magnetic medium and said head assembly are tilted relative to one another.

11. A device according to claim 10, wherein the gaps have different projected widths in a direction perpendicular to a motion of the recording medium.

12. A device according to claim 10, wherein an offset between said gaps in a given column is such that when projected along the direction of the motion of the recording medium one side of a given gap is adjacent to an opposite side of an adjacent next or previous gap in a same column.

13. A device according to claim 10, wherein an offset between a last gap of a given column and a first gap of a next column is such that when projected along the direction of the motion of the recording medium a side facing the next column of said last gap on said given column is adjacent to a side facing said given column of said first gap of the next column to ensure proximity between neighboring packs of tracks written by said given columns of gaps.

14. A device according to claim 1, wherein said matrix array is oblique, said matrix array being formed of n rows and m columns, wherein said gaps are positioned with their width along the rows and their length along the columns, said n rows and m columns being parallel one to another, wherein said gaps are aligned within each row and offset within each column so as to write parallel tracks onto the recording medium, said recording medium moving in a direction perpendicular to the direction of the rows and to the gaps.

15. A device according to claim 14, wherein the gaps have different projected widths in a direction perpendicular to a motion of the recording medium.

16. A device according to claim 1, wherein adjacent ones of said gaps within one given column are staggered, said gaps being alternatively tilted with respect to a perpendicular to a direction of motion of the recording medium with opposite angles from one head within a given column to a next head within said given column such that bits on the recording medium are written at an angle different from 90 degrees with respect to a direction of motion of the recording medium, said angle alternating from one given track to a next adjacent track to achieve azimuthal recording.

17. A device according to claim 16, wherein the gaps have different projected widths in a direction perpendicular to a motion of the recording medium.

18. A device according to claim 1, wherein a number of columns is limited to two.

19. A device as claimed in claim 18, wherein interconnects are outside of a matrix heads area.

20. A device according to claim 1, wherein a number of columns is limited to one.

21. A device as claimed in claim 20, wherein interconnects are outside of a matrix heads area.

22. A device according to claim 1, further comprising:
a head die having said matrix array, front and back edges of a head die are blended so as to provide a negative pressure on moving recording medium, said negative pressure being maximum in the vicinity of the matrix array.

23. A device according to claim 1, further comprising:
a head die having said matrix array, a surface of the head die facing the recording medium being shaped so as to form a tape bearing surface, said tape bearing surface inducing a negative pressure on the tape, said negative pressure being maximum in a vicinity of said matrix array, and an air flow that prevents loose particles of moving across the heads matrix array.

24. A device according to claim 1, further comprising:
a head die having said matrix array, a surface of the head die facing the recording medium being covered by a wear resistant material, said wear resistance material covering at least part of said surface of the head die.

25. A device according to claim 1, further comprising:
a head die having said matrix array, at least one of the heads of the matrix array are used to control a position of the recording medium with respect to the head die as servo heads.

26. A device according to claim 25, wherein said servo heads are located within the matrix array.

27. A device according to claim 25, wherein said servo heads are located outside of the matrix array on a different region of said head die.

28. A device according to claim 25, wherein said servo heads are similar in their geometry and performances to the write heads of the matrix array.

29. A device according to claim 25, wherein said servo heads are different in their geometry and performances to the write heads of the matrix array.

30. A device according to claim 1, wherein control of the individual heads of the matrix array is independent so that each head is excited independently through its corresponding conductor.

31. A device according to claim 30, wherein absolute values of excitation currents are different for each said head so as to favor efficiency of writing onto the medium.

32. A device according to claim 30, wherein said excitation is sequential.

33. A device according to claim 30, wherein said excitation of the heads in said matrix array is simultaneous.

34. A device as claimed in claim 30, wherein said excitation is other than sequential or simultaneous, and favors efficiency in writing onto the medium to minimize writing to the recording medium onto tracks adjacent to a track selected to be written by said selecting head.

35. A device according to claim 30, wherein an excitation sequence is such that secondary excitation currents are sent simultaneously into the heads adjacent within a given column to the head that is selected to write via a primary excitation current, said secondary excitation current being opposite in sign to the primary excitation current and with an absolute value to minimize corresponding writing on the recording medium of tracks adjacent to a track selected to be written by said corresponding selected head.

36. A device according to claim 30, wherein the control electronics is at least partially embedded into the substrate, said control electronics being processed on a same substrate prior to fabrication of the matrix array and connected to the excitation conductors by interconnects.

37. A device according to claim 30, wherein the head die is assembled onto another adjacent substrate having the control electronics, a connection between the excitation coils of said head die and the control electronics being provided by pads and bumps on at least one of said head die and said control electronics substrate.

38. A device according to claim 1, wherein said device is used in a linear tape drive.

* * * * *